United States Patent [19]

Bishop

[11] Patent Number: 4,583,620

[45] Date of Patent: Apr. 22, 1986

[54] VEHICLE HOIST

[75] Inventor: Burton D. Bishop, Salisbury, Md.

[73] Assignee: Dresser Industries, Inc., Dallas, Tex.

[21] Appl. No.: 51,326

[22] Filed: Jun. 22, 1979

[51] Int. Cl.[4] .............................................. B60S 13/00

[52] U.S. Cl. .................................... 187/8.75; 403/161

[58] Field of Search .................... 187/8.75, 8.74, 8.59, 187/8.41, 8.54, 8.67; 403/217, 65, 83, 161, 162; 308/63, 69, 237 A, 120 R, 244; 411/384, 546; 220/288, 289, 327

[56] References Cited

U.S. PATENT DOCUMENTS

| | | | |
|---|---|---|---|
| 1,774,889 | 9/1930 | Kanning et al. | 220/288 |
| 1,915,933 | 6/1933 | Hobler | 308/69 |
| 1,938,550 | 12/1933 | Todd | 187/8.75 |
| 2,524,652 | 10/1950 | Dalley | 403/161 |
| 2,878,897 | 3/1959 | Cochin | 187/8.75 |
| 3,035,662 | 5/1962 | Hott | 187/8.75 |
| 3,080,018 | 3/1963 | Sinclair | 187/8.75 |
| 3,205,977 | 9/1965 | Goldzwig et al. | 187/8.75 |
| 4,179,038 | 12/1979 | Rosan, Jr. | 220/288 |

FOREIGN PATENT DOCUMENTS

| | | | |
|---|---|---|---|
| 569828 | 10/1958 | Belgium | 187/8.75 |
| 1142279 | 9/1957 | France | 187/8.75 |
| 1184750 | 6/1959 | France | 187/8.74 |
| 868245 | 8/1951 | United Kingdom | 187/8.75 |
| 755405 | 8/1956 | United Kingdom | 187/8.75 |

*Primary Examiner*—Joseph J. Rolla
*Assistant Examiner*—Kenneth Noland
*Attorney, Agent, or Firm*—Fred A. Winans

[57] ABSTRACT

A hydraulically operated vehicle hoist having four extendable swivel arms each pivotally mounted for horizontal displacement on the head of a cylindrical plunger. Pivotting of each arm is provided by means of a vertical spacer tube disposed through the inboard end of the arm in a cavity spacing between a wear plate on the plunger head and a cover plate to which the spacer tube is threadedly connected. Individual adjustment of each cavity height to accommodate dimensional variations in thickness of the respective swivel arm supported thereby is afforded by rotationally locking the spacer tube to its associated arm via a bent rod or Allen wrench positioned through aligned apertures in each. Concomitant arcuate displacement of the locked spacer tube and arm causes threaded vertical displacement of the cover plate whereby the cavity height can be adjustably set to clearance specifications.

4 Claims, 6 Drawing Figures

VEHICLE HOIST

TECHNICAL FIELD

The field of art to which the invention pertains includes the art of hoists and lifts for roadway vehicles.

BACKGROUND OF THE PRIOR ART

Vehicle hoists are widely used at gasoline stations, repair garages and the like wherever service is customarily performed on the underside of a roadway vehicle. Such hoists are commercially available from a variety of manufacturers, and while they may differ in detail from one manufacturer to another, they generally consist of a super structure including a bolster or a pair of bolsters to which arms or wheel tracks are attached for underlying support of a vehicle. Exemplifying adjustable arm-type support structures in a vehicle lift are the disclosures of U.S. Pat. Nos. 3,080,018 and 2,878,897.

The individual arm-type unit has long been a preferred choice for general garage automotive service in that it leaves the vehicle wheels suspended and therefore accessible for maintenance while being of a relatively low cost construction compared to other types of available units. Typically, the arm-type unit includes four arms in which the inboard end of each is pivotally connected and retained via a transverse pin in a more or less horizontal plane. The pivot pin customarily extends into a base plate supported on the hoist mechanism while a cover plate overlying the arm end cooperates with the base plate to define a pivot cavity of predetermined height therebetween. The cavity is preferably sized to closely accommodate the thickness of the received swivel arm so as to permit free horizontal swivelling of the arm without binding. A problem with such cavities, however, has been the dimensional clearance variation between the opposing faces defining the cavity and the swivel arm received therein resulting from expected mill tolerances or wear. Whatever the cause, insufficient clearance can produce binding and damage while excessive clearance results in undue sag at the distal end of the arm. Uncontrolled and/or differential sag variation in the individual arms can in turn result in imperfect and undesirable canting of a vehicle in the course of being lifted. The prior solution for overly thin arms has been to shim the arm while excessively thick arms have required machining or replacement.

Despite recognition of the foregoing, a ready solution has not heretofore been known.

SUMMARY OF THE INVENTION

This invention relates to hydraulically operated vehicle hoists and more specifically to such hoists of the individual arm-type employing pivotally mounted swivel arms. Unlike similar purpose constructions of the prior art, the invention hereof affords adjustability to the arm cavity height for each individual arm as to enable custom setting for the clearance thereof. Should wear of the components subsequently affect the initial clearance setting, further adjustment to take up unneeded slack can be readily performed. Since the cavity clearance can be custom matched on site, the previous problem of binding and/or sag associated with prior art constructions has been substantially, if not completely, eliminated.

The foregoing is achieved in accordance with the invention by pivotally supporting each arm at its inboard end on a vertical spacer tube secured to a base plate on the hoist mechanism and threaded into a common cover plate superposed over the arms. The cover plate with a spaced apart wear plate on the plunger cooperate to define the arm cavity spacing therebetween. Cap screws, the heads of which are recessed in the cover plate, extend through the spacer tubes to join the cover plate to the plunger head in a rigid assembly. Radial apertures in the annulus of the spacer tube when aligned with a transverse drilled opening in the arm permits a tool such as a bent rod to be inserted for rotationally locking the spacer tube to the arm. By releasing the cap screw and then pivotting the arm, rotation of the spacer tube with respect to the rotationally fixed cover plate is effected causing the latter to vertically displace. On retightening the cap screw, the setting becomes fixed, and the clearance is thereafter maintained until such time as wear of the components prompt need for further adjustment. By these means, therefore, the arms of a properly maintained hoist need never encounter any undesirable degree of sag as characteristically exist in the constructions of the prior art.

It is therefore an object of the invention to provide a novel construction for a hydraulically operated vehicle hoist.

It is a further object of the invention to provide a novel swivel arm-type vehicle hoist in which the cavity spacings for the support arms can be individually adjusted for maintaining optimum operating clearance therebetween.

Figure 1:
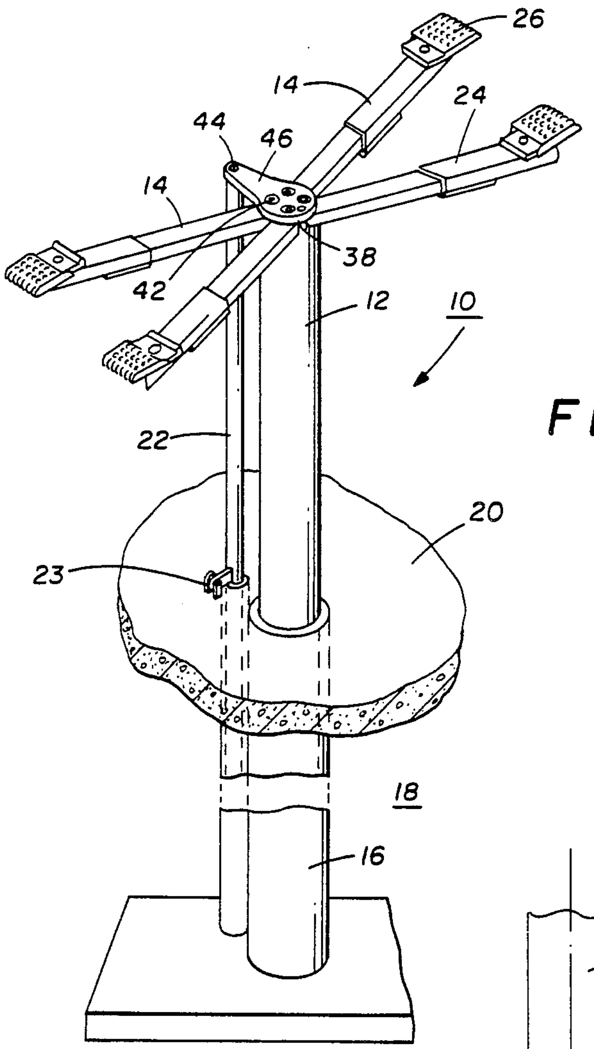
FIG. 1 is an isometric top view of a vehicle hoist constructed in accordance with the invention hereof.
Figure 2:
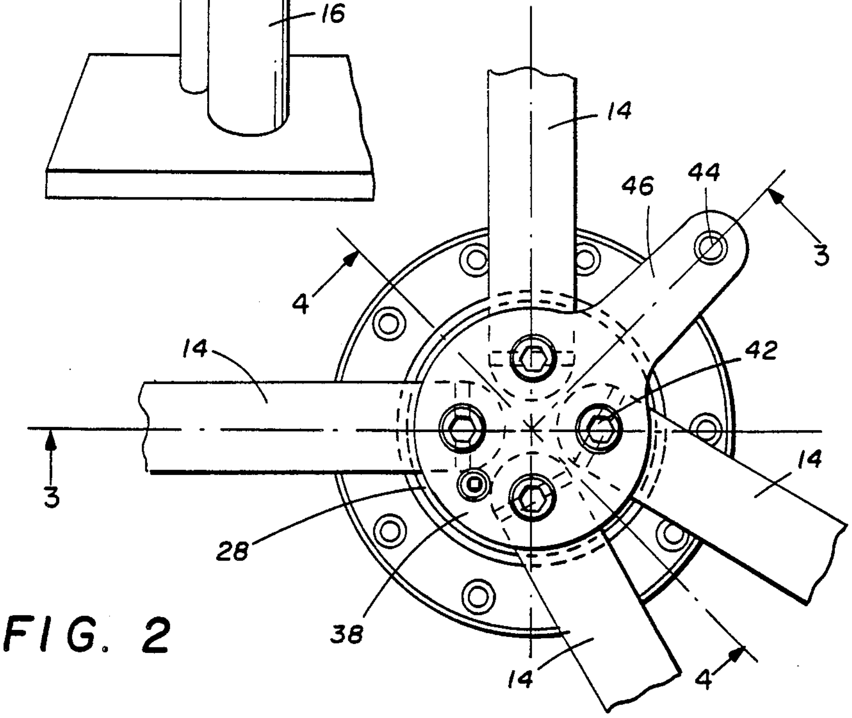
FIG. 2 is an enlarged fragmentary plan view about the center of the hoist of FIG. 1.
Figure 3:
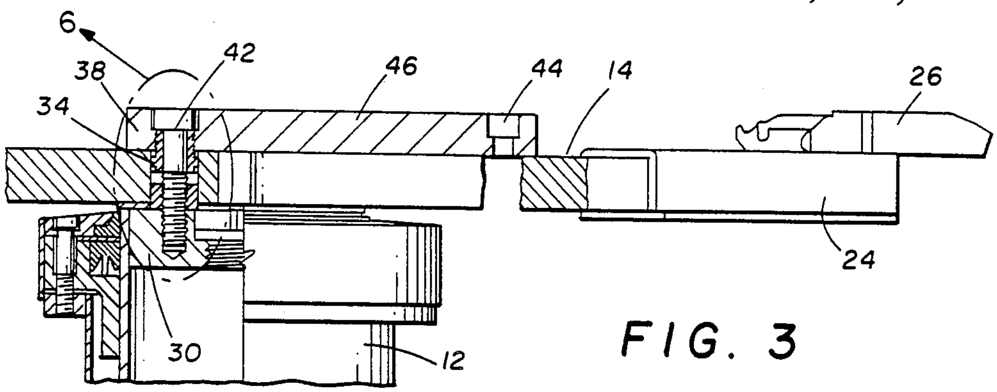
FIG. 3 is a sectional elevation taken substantially along the lines 3—3 of FIG. 2.
Figure 4:
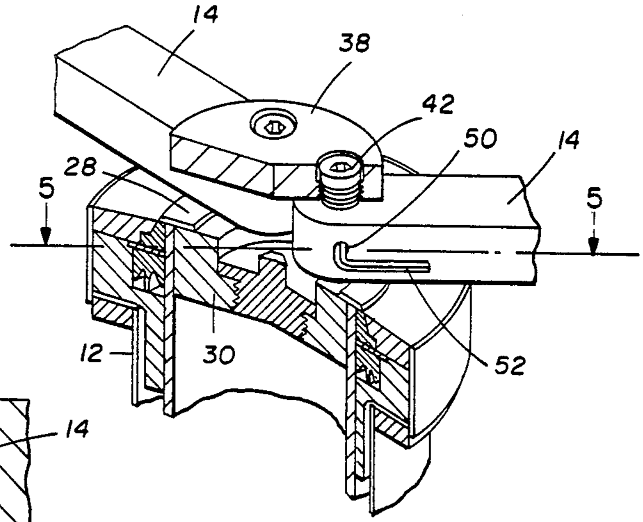
FIG. 4 is a fragmentary sectional isometric view taken substantially along the lines 4—4 of FIG. 2.
Figure 5:
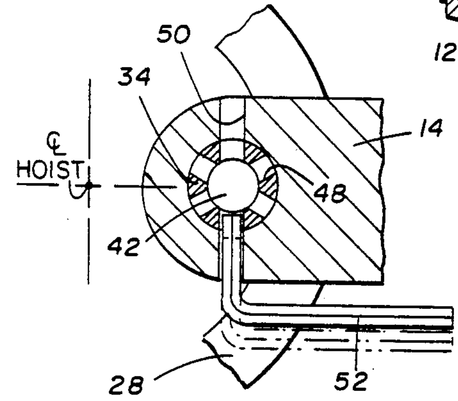
FIG. 5 is a sectional plan view taken substantially along the lines 5—5 of FIG. 4.
Figure 6:
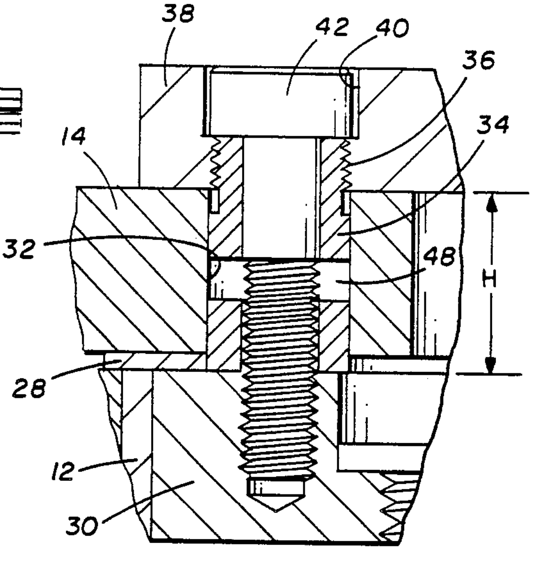
FIG. 6 is an enlarged fragmentary section of the encircled portion 6 of FIG. 3.

Referring initially to FIG. 1, there is illustrated a vehicle hoist 10 of the single post type that includes a piston plunger 12 which at its top end supports a superstructure in the form of four independent swivel arms 14. Normal tolerance of the arm material when received from the mill is usually about 0.010 inches in any one lot of steel. Each cantilevered swivel arm 14 includes a telescopic extension 24, the distal end of which contains an adjustable swivel pad 26 for underside engagement with a vehicle to be elevated. The piston is telescopically arranged with respect to a cylinder 16 that extends downward into an excavation 18 below a normally concrete work floor 20. Also extending vertically through floor 20 is a stabilizer bar 22 which functions to prevent inadvertent rotation of piston 12. A customary locking device 23 engages the lower end of stabilizer bar 22 to prevent accidental lowering. A hydraulic system (not shown) operates the hoist for elevating and lowering a vehicle in a well known manner.

For supporting the cantilevered swivel arms 14, there is provided, as will now be described with reference to FIGS. 2-6, a hardened wear plate 28 positioned directly on the top face of plunger head 30 which also functions in this arrangement as the bolster base plate. The inboard end of each swivel arm is supported to rest on wear plate 28 and includes a bore 32 containing a spacer tube 34 about which the arm is free to swivel. Superposed over the inboard arm end threaded at 36 to the spacer tube is a cover plate 38 that includes an aperture 44 in an extension 46 for connecting to stabilizer bar 22. Individual counterbores 40 in the top side of the cover plate provide a recess adapted to receive a cap screw 42 that when threadedly connected to the plunger head sandwiches the components thereat in a rigid assembly. It can be seen in this arrangement that tube 34 also serves to define a cavity spacing of dimension "H" between the undersurface of cover plate 38 and the top surface of wear plate 28, as will be understood, to enable easy swivel of arms 14 without undue sag thereof. An initial arm clearance of about 0.010 to 0.012 inches is desirable.

To enable adjustment of height "H" to manufacturer's specification, each spacer tube 34 includes a plurality of radial apertures 48 about 60 degrees displaced. For alignment with any one aperture 48, each arm 14 includes a transverse horizontal bore 50 intersecting the axis of vertical bore 32 at a vertical location in the arm generally coinciding with the axes of the tube apertures.

When dimension "H" is to be adjusted, cap screws 42 are first loosened after which the affected arm 14 at which adjustment is to be made is swivelled until its bore 50 coincides with an aperture 48 of the spacer tube. A hex key wrench, bent rod or the like 52 can then be inserted for rotationally securing spacer tube 34 to the arm in the manner of FIG. 5. By then swivelling the arm in either direction, concomitant rotational displacement of the spacer tube occurs such that via its threaded connection 36 to cover plate 38, vertical displacement of the latter is effected to change cavity dimension "H". On appropriate adjustment being achieved, wrench 52 is removed, and cap screw 42 retightened to again rigidly secure the assembly at the desired cavity setting. After initial adjustment of a new hoist, further adjustment is usually infrequent.

By the above description there has been disclosed a novel construction for a swivel arm vehicle hoist enabling the cavity dimension to be individually adjusted for accommodating variations in swivel arm height or from wear thereof. The adjustment feature is relatively simple in principle yet is highly effective in eliminating the sag and/or machining problems previously associated with individual arm-type hoists of the prior art as to resolve a long standing problem previously associated with such hoists. Whereas the invention has been described in its preferred embodiment as including individual adjustment capability for each of the arms, it is contemplated that less than all the arms could be adjustable in that manner, including the possibility of one central adjustment when merited.

Since many changes could be made in the above construction and many apparently widely different embodiments of this invention could be made without departing from the scope thereof, it is intended that all matter contained in the drawings and specification shall be interpreted as illustrative and not in a limiting sense.

The embodiments of the invention in which an exclusive property or priviledge is claimed are defined as follows:

1. A vehicle hoist including a hoisting mechanism, a plurality of support arms adapted for engaging the underside of a vehicle to be hoisted, each of said arms extending cantilevered outward from its inboard end swivel mounted on a wear plate of said hoisting mechanism, and a cover plate secured superposed to said wear plate and over the inboard end of said arms, said cover plate cooperating with the wear plate on said hoisting mechanism to define a swivel cavity for swivel of said arms therebetween, and adjustment means operable with said arms in position for varying the height spacing of said swivel cavity to a predetermined clearance spacing for each of said arms and including means comprising an adjustably settable spacer tube in association with said arms to determine the vertical spacing between said cover plate and said wear plate to permit a plurality of adjustments, each of which is selectively operable for varying the swivel cavity spacing for an individual of said arms.

2. In a vehicle hoist according to claim 1 including a plurality of spacer tubes each threadedly connected to said cover plate and providing the pivot axis for the inboard end of one of said arms, and said adjustment means includes displacement means to arcuately displace said spacer tubes individually relative to said cover plate for varying said cavity spacing by vertically displacing said cover plate.

3. In a vehicle hoist according to claim 2 in which said displacement means includes means for effecting a rotational interlock between an arm and its spacer tube whereby swivelling of the interlocked arm effects said cover plate displacement thereat.

4. In a vehicle hoist according to claim 3 in which said spacer tube includes an aperture in its annulus, its interlocked arm includes a lateral aperture adapted by swivel positioning of the arm to coaxially align with the annulus aperture of said spacer tube, and said rotational interlock is effected by an elongated member positioned commonly extending into both of said apertures.

* * * * *